(12) United States Patent
Kniese

(10) Patent No.: US 8,156,995 B2
(45) Date of Patent: Apr. 17, 2012

(54) DOOR ELEMENT

(75) Inventor: Leif Kniese, Berlin (DE)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 12/426,685

(22) Filed: Apr. 20, 2009

(65) Prior Publication Data

US 2010/0263803 A1    Oct. 21, 2010

(51) Int. Cl.
*E06B 9/20*    (2006.01)
(52) U.S. Cl. .......... 160/352; 160/40; 160/188; 160/236; 52/173.2
(58) Field of Classification Search .................. 160/352, 160/368.1, 40, 132, 188, 236; 52/173.2; 49/475.1, 324
See application file for complete search history.

(56) References Cited

U.S. PATENT DOCUMENTS

| | | | |
|---|---|---|---|
| 1,327,807 A | 1/1920 | Burleigh | |
| 2,087,758 A | 7/1937 | Friend | |
| 2,273,207 A | 2/1942 | Kuhn | |
| 2,706,825 A | 4/1955 | Blakeman | |
| 3,322,132 A * | 5/1967 | Rieder et al. ................. | 135/123 |
| 3,406,422 A | 10/1968 | Nichols | |
| 3,541,626 A * | 11/1970 | Eggert, Jr. .................... | 135/128 |
| 3,877,750 A | 4/1975 | Scholpp | |
| 3,951,395 A | 4/1976 | Hennenfent et al. | |
| 4,623,157 A | 11/1986 | Rohs | |
| 4,719,826 A | 1/1988 | DuBois | |
| 5,125,196 A * | 6/1992 | Moody ........................ | 52/173.2 |
| 5,240,308 A | 8/1993 | Goldstein et al. | |
| 5,328,245 A | 7/1994 | Marks et al. | |
| 5,518,294 A | 5/1996 | Ligon, Sr. et al. | |

(Continued)

FOREIGN PATENT DOCUMENTS

AU    6563380    1/1983
(Continued)

OTHER PUBLICATIONS

International Searching Authority, "Partial Search Report," issued in connection with international application serial No. PCT/US2010/031581, mailed Jun. 8, 2010, 1 page.

(Continued)

*Primary Examiner* — Blair M. Johnson
(74) *Attorney, Agent, or Firm* — Hanley, Flight & Zimmerman, LLC

(57) ABSTRACT

Door elements having FinRay structures are described herein. An example door element described herein is movable between a closed position in which the element extends across a doorway to at least partially block the doorway, and an open position where at least a portion of the element moves to a non-blocking position relative to the doorway. The door element includes a first flexible side element to transmit tensile forces and has a proximal end and a distal end. The door element includes a second flexible side element to resist compressive forces and has a proximal end and a distal end. The first and second side elements are coupled to each other at their distal ends. The element includes a plurality of connecting ribs flexibly coupled to the first and second side elements to transmit tensile forces between the first and second side elements. An actuator applies a longitudinal tensile force to the proximal end of the first side element, where the resulting deformation of the second side element is transmitted to the first side element by the connecting ribs in movement of the door element to the open position.

11 Claims, 15 Drawing Sheets

U.S. PATENT DOCUMENTS

| | | | |
|---|---|---|---|
| 5,611,104 | A | 3/1997 | DeMars |
| 5,795,002 | A | 8/1998 | Boron |
| 5,954,399 | A | 9/1999 | Hong |
| 5,964,780 | A | 10/1999 | Balazs |
| 6,089,178 | A * | 7/2000 | Yamamoto et al. ........... 114/337 |
| 6,609,754 | B2 | 8/2003 | Rajasingham |
| 6,746,287 | B2 * | 6/2004 | Yamamoto et al. ............. 440/15 |
| 6,820,933 | B2 | 11/2004 | Fereira Da Silva |
| 6,986,549 | B2 * | 1/2006 | Kniese ...................... 297/284.1 |
| 7,526,828 | B2 | 5/2009 | Kniese |
| 2002/0095739 | A1 | 7/2002 | Dingert |
| 2004/0183348 | A1 | 9/2004 | Kniese |
| 2007/0094834 | A1 | 5/2007 | Gil |
| 2009/0288266 | A1 | 11/2009 | Dingert et al. |
| 2010/0263500 | A1 * | 10/2010 | Bannasch et al. ................ 81/487 |
| 2010/0263803 | A1 * | 10/2010 | Kniese .......................... 160/127 |
| 2011/0281479 | A1 * | 11/2011 | Bannasch et al. ................ 440/13 |

FOREIGN PATENT DOCUMENTS

| | | |
|---|---|---|
| DE | 4121768 | 10/1992 |
| DE | 4411610 | 10/1995 |
| DE | 4432656 | 3/1996 |
| DE | 19537320 | 4/1997 |
| DE | 20215674 | 1/2003 |
| DE | 10154969 | 6/2003 |
| DE | 20318845 | 3/2004 |
| DE | 102005010380 | 9/2006 |
| DE | 102006009559 | 5/2007 |
| DE | 102007026721 | 5/2008 |
| EP | 0453713 | 10/1991 |
| EP | 0489237 | 6/1992 |
| EP | 0860355 | 8/1998 |
| EP | 1203640 | 5/2002 |
| EP | 1224901 | 7/2002 |
| EP | 1316651 | 6/2003 |
| EP | 2327623 | 6/2011 |
| FR | 545837 | 10/1922 |
| FR | 1068390 | 6/1954 |
| FR | 1087906 | 3/1955 |
| FR | 2266805 | 10/1975 |
| FR | 2715124 | 7/1995 |
| GB | 2297478 | 1/1996 |
| JP | 02003231496 A * | 8/2003 |
| LU | 88528 | 3/1996 |
| WO | 9707707 | 3/1997 |
| WO | 9908570 | 2/1999 |
| WO | 0030494 | 6/2000 |
| WO | 03039816 | 5/2003 |
| WO | 2009039231 | 3/2009 |

OTHER PUBLICATIONS

International Searching Authority, "International Search Report," issued in connection with international application serial No. PCT/US2010/031581, mailed Aug. 5, 2010, 5 pages.

International Searching Authority, "Written Opinion of the International Searching Authority," issued in connection with international application serial No. PCT/US2010/031581, mailed Aug. 5, 2010, 15 pages.

International Bureau, "International Preliminary Report on Patentability," issued in connection with international application serial No. PCT/US2010/031581, mailed Nov. 3, 2011, 14 pages.

United States Patent and Trademark Office, "Notice of Allowance," issued in connection with U.S. Appl. No. 10/476,940, mailed Nov. 26, 2004, 11 pages.

United States Patent and Trademark Office, "Notice of Allowance," issued in connection with U.S. Appl. No. 11/815,991, mailed Dec. 18, 2008, 10 pages.

United States Patent and Trademark Office, "Non-Final Office Action," issued in connection with U.S. Appl. No. 11/815,991, mailed Aug. 20, 2008, 18 pages.

United States Patent and Trademark Office, "Notice of Allowance," issued in connection with U.S. Appl. No. 12/442,683, mailed Nov. 30, 2011, 12 pages.

United States Patent and Trademark Office, "Non-Final Office Action," issued in connection with U.S. Appl. No. 12/442,683, mailed Jul. 27, 2011, 10 pages.

* cited by examiner

DOOR ELEMENT

FIELD OF THE DISCLOSURE

The subject disclosure generally pertains to doors, coverings and other moving architectural elements and, more specifically, to such an element incorporating a structure capable of a bending deformation in response to linearly applied forces.

BACKGROUND

Doors, coverings for various openings and other movable architectural elements are ubiquitous in residential, institutional, commercial, and industrial buildings. Moreover, doors take on a wide variety of sizes and configurations. For example, for doors that are powered opened or closed by a motor or other actuator, the following factors may be among those that are important for door operation: 1) reliability—such as having a simple construction and a minimum of moving parts; 2) opening/closing speed—a door that opens and closes rapidly can perform its function with a minimum air transfer through the doorway, and/or may enhance productivity in industrial or commercial settings; and 3) a minimal footprint—since space may be at a premium around a door opening, it is desirable for a door and its mounting structure and source of actuation to take up as little space as possible. A door, covering or other architectural element that addresses one or several of these factors, while providing other benefits and functionality, would be desirable.

DETAILED DESCRIPTION

Figure 1A:
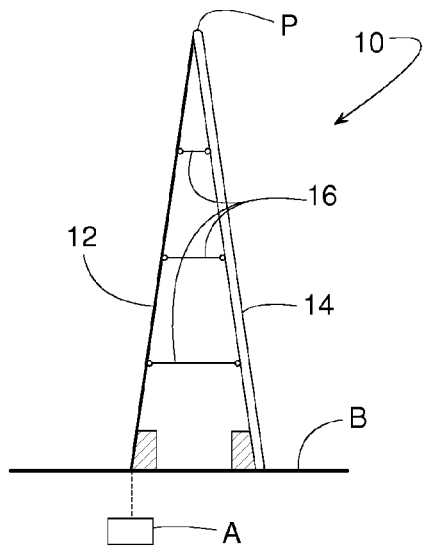
FIGS. 1a-d are plan views of an example deformable structure disclosed herein.

The underlying operating principles for the doors and other coverings to be referred to herein are generally described by reference to FIGS. 1a-1d. In FIGS. 1a-1d, a structure 10 is shown that is capable of a bending deformation in response to linearly applied forces, such as forces applied in a longitudinal direction to side elements of the structure 10. Examples of such structure 10 are those which exhibit the FinRay® effect (FINRAY is a registered trademark of Evologics, GmbH of Berlin, Germany). Throughout this disclosure, such structures (e.g., the structure 10) will thus be referred to generally as FinRay structures. The structure 10 of FIG. 1a-1d includes, in this example, a first flexible side element in the form of a tensile element 12 which is connected to a second flexible side element in the form of a pressure or compression-resistant element 14, which can also transmit tensile forces, at a connection point P. The term flexible is intended to encompass members that are capable of deformation or deflection without permanent deformation (e.g., members that can elastically deflect or deform). As shown in FIG. 1a, both elements 12, 14 are fixable at their free ends (the end not connected to the other member and opposite connection point P) to a base B. In this case, the tensile element 12 extends through an opening in the base B, and is coupled to an actuator A (e.g., a powered actuator, a manually-applied force, etc.) that exerts a longitudinal force on the tensile element 12, in the form of a pulling tensile force on the tensile member 12 in a direction depicted by the arrow in FIG. b. If the structure 10 were formed of just the tensile element 12 and the pressure element 14, the result of a pulling force being exerted on the tensile element 12 causes the connection point P to deflect and trace a path toward the location where the tensile element 12 passes through the base B. If the pulling force continued, the connection point P would eventually be brought to the location where the tensile element 12 passes through the base B, and the pressure element 14 would be in a bowed-out configuration. Throughout this process, the tensile element 12 would maintain a straight-line configuration, as only longitudinal tensile forces are exerted upon it.

In some examples of FinRay structures, however, the tensile element 12 and the pressure element 14 are not just coupled at the connection point P. Rather, as shown in FIG. 1a-1d, a series of connectors in the form of ribs 16 couple the two elements 12, 14 together. The ribs 16 can at least transmit tensile forces, but may also be pressure members. The connection of the ribs 16 to each of the tensile 12 and pressure 14 elements is a flexible connection—for example a pivoting connection—but one that does not translate along either of the side elements 12, 14. The presence of these ribs 16, which serve to at least transmit tensile forces from the pressure element 14 to the tensile element 12, allows the structure 10 to undergo an overall bending deformation for forces applied longitudinally to the side elements 12, 14.

Figure 1B:
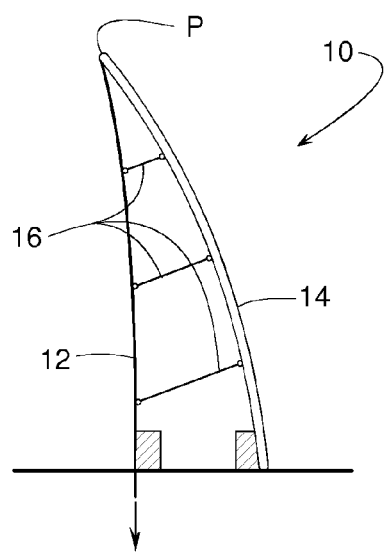

Such bending deformation is shown in FIG. 1b. Initially, the pulling force on tensile element 12 causes some deflection of the connection point P. As that deflection occurs, however, and pressure element 14 begins to bend and deform, tensile forces are transmitted through the ribs 16 to the tensile element 12, causing that the tensile element 12 to also deform in a similar (although not necessarily identical) manner to that of the pressure element 14. Accordingly, application of a pulling force to the tensile element 12 results in both sides of the structure 10 taking on a curved configuration.

Typically, the curvature exhibited by the tensile element 12 and the pressure element 14 will be different. This may be due to a variety of factors. For example, the material properties of elements 12, 14 may be different. This may be due to the properties of the material itself, or different geometries (e.g. cross-sectional area) of similar materials. Also, the tensile element 12 in this scenario is under tension, and thus more resistant to bending than it would be were it not under tension—and thus typically more resistant to bending than the pressure element 14.

Figure 1C:
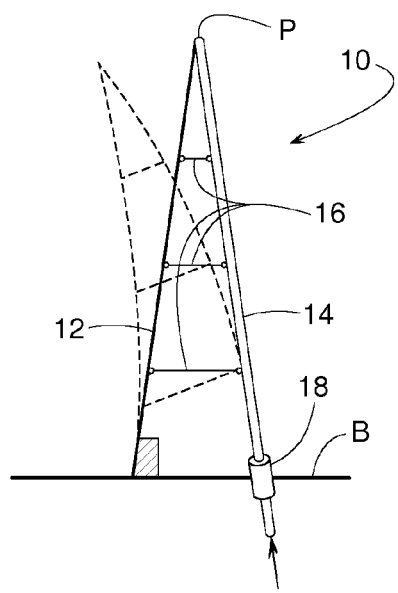

In FIG. 1c, a similar function of structure 10 is shown, but with a longitudinal force in the form of a pushing force being exerted on the pressure element 14. In this case, the tensile element 12 is fixed at its free end (the end opposite connection point P). Constraint of the free end of the pressure element 14 to move longitudinally is preferred to maximize the FinRay effect for the structure 10. In this example, the free end of the pressure element 14 is depicted by a bearing cylinder 18. Application of the pushing force in a direction depicted by the arrow in FIG. 1c to the end of the pressure element 14 causes deflection of the connection point P (constrained by the tensile element 12), and deformation of the pressure element 14. Due to the ribs 16 connecting the pressure 12 and tensile 14 elements, the deformation of the pressure element 14 acts upon the tensile element 12 to cause a resulting deformation of the tensile element 12 and thus a bending deformation of the overall structure 10. Although the motion of the structure 10 in FIGS. 1b) and 1c) is somewhat different given that the end of the pressure element 14 is allowed to translate as shown in FIG. 1c, but not in FIG. 1b), the resulting effect is similar.

Figure 1D:
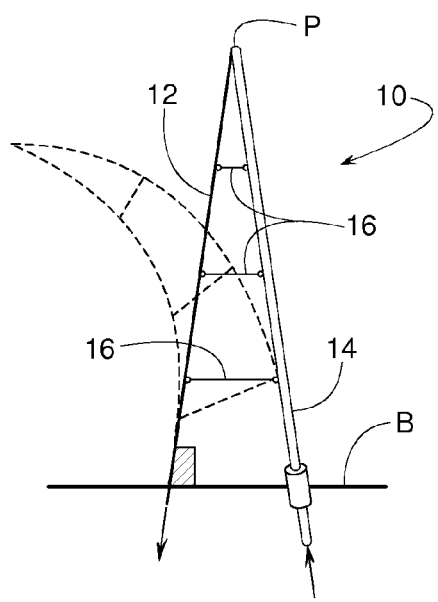

FIG. 1d shows that the FinRay effect can be made more pronounced for a similar amount of displacement of both of the free ends of the tensile 12 and pressure 14 elements by substantially simultaneously pulling on the tensile member 12 while applying a pushing force to the pressure member 14.

It should also be noted that a property of FinRay structures like that shown in FIGS. 1a-1d is a magnification of movement. For a small displacement of the tensile member 12 by a pulling force (as shown in FIGS. 1b and 1d) and a pushing force (as shown in FIGS. 1c and 1d), a significant movement of the connection point P is achieved—along with the overall deflection/bending of the structure 10. The amount of such magnification is greater as one approaches the connection point P.

The various properties and responses of the structure 10, and others like it to be described below, make it well-suited for use as a door or other kind of covering for openings (e.g. window coverings, sunroofs, covers for roof openings of skylights, etc.), or as any moving architectural element (e.g. a movable wall, an actuation mechanism for an awning, etc). A door or other covering based on the properties of structure 10 gives a free passage to the opening being covered very rapidly as the movement magnification referred to above also translates into a magnification of opening and closing velocity of the door. The construction can be made lightweight, as will be shown in examples below. For example, an example door or covering described herein may include as few as one or two structures similar to the structure 10 being capable of actuating a larger door construction opened and closed. Additionally or alternatively, the speed of opening and closing the example door also allows minimization of air exchange between the volumes on either side of the doorway or opening enclosed by the door, since the door may be open for a shorter period of time as compared to conventional doors. And all of this is achieved with only a small displacement of an actuator or actuation mechanism for a structure like structure 10 as a part of the door, covering or architectural element in light of the movement magnification properties.

The structure 10 as described or illustrated in FIGS. 1a-1d is well-suited for movement in one direction from its rest position (e.g., a counterclockwise direction in the sense of FIGS. 1a-1d). The structure 10 of FIGS. 1a-1d would not properly function according to the FinRay effect for movement in an opposite direction (e.g., a clockwise direction), as the presence of a pressure element (e.g., the pressure element 14) on the side of the structure opposite the direction of movement or bending deformation is important to the FinRay effect.

Figure 2:
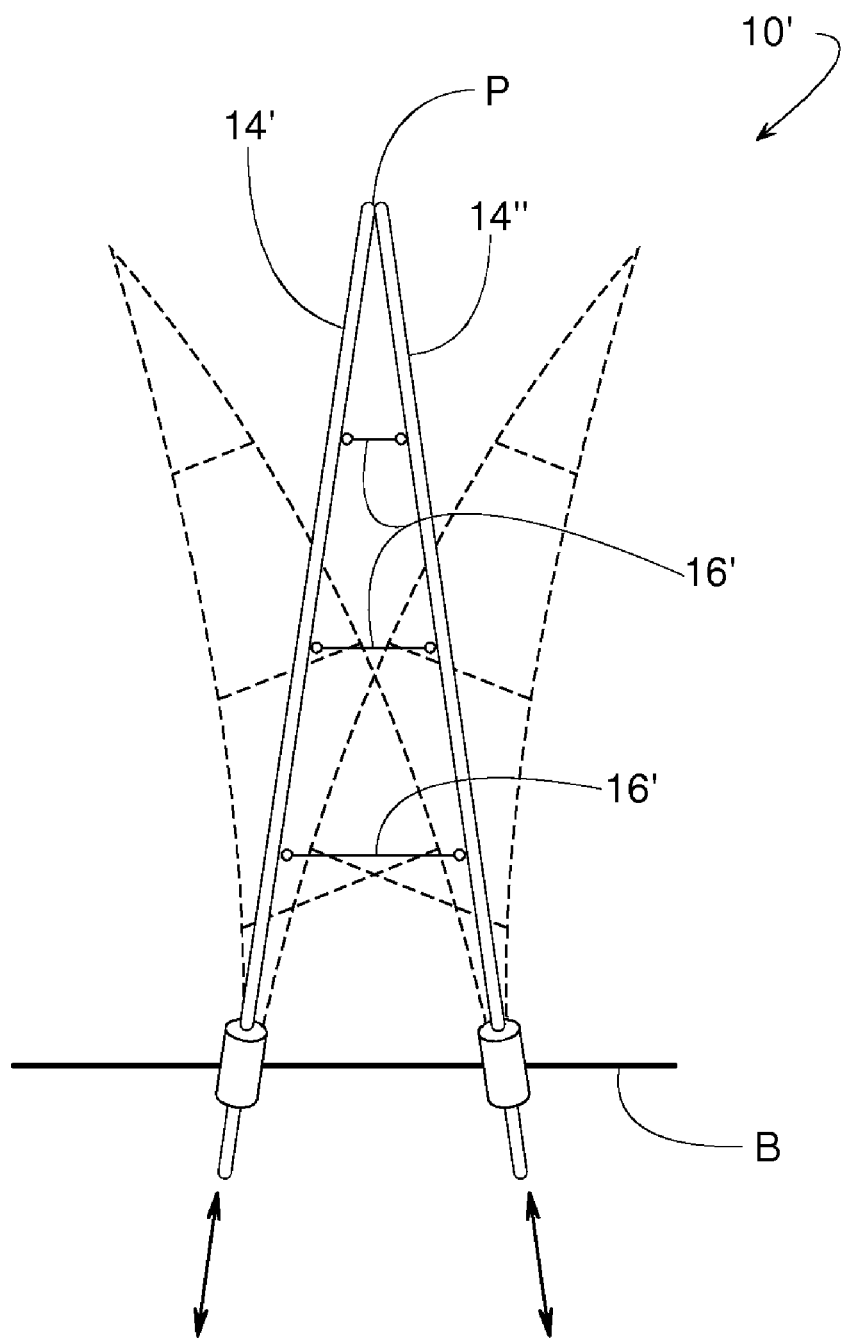
FIG. 2 is a plan view of another example deformable structure described herein.

FIG. 2 shows a structure 10' with pressure members 14' and 14" forming both side elements of the structure 10'. As a result, and as shown in FIG. 2, the structure 10' is capable of being actuated in either direction (e.g., a clockwise or counterclockwise direction as shown for illustration by the broken lines) by appropriately applied longitudinal forces in the form of pulling, pushing forces, or a combination of both. This structure, then, would be well-suited for a door or covering application where an opening movement in both directions is desired. It should also be noted that in this and similar configurations, the ribs 16' may transmit not only tensile forces between the side members 14', 14", but also pressure forces, depending on the mechanics of response of the structure 10' to applied forces.

Figure 3:
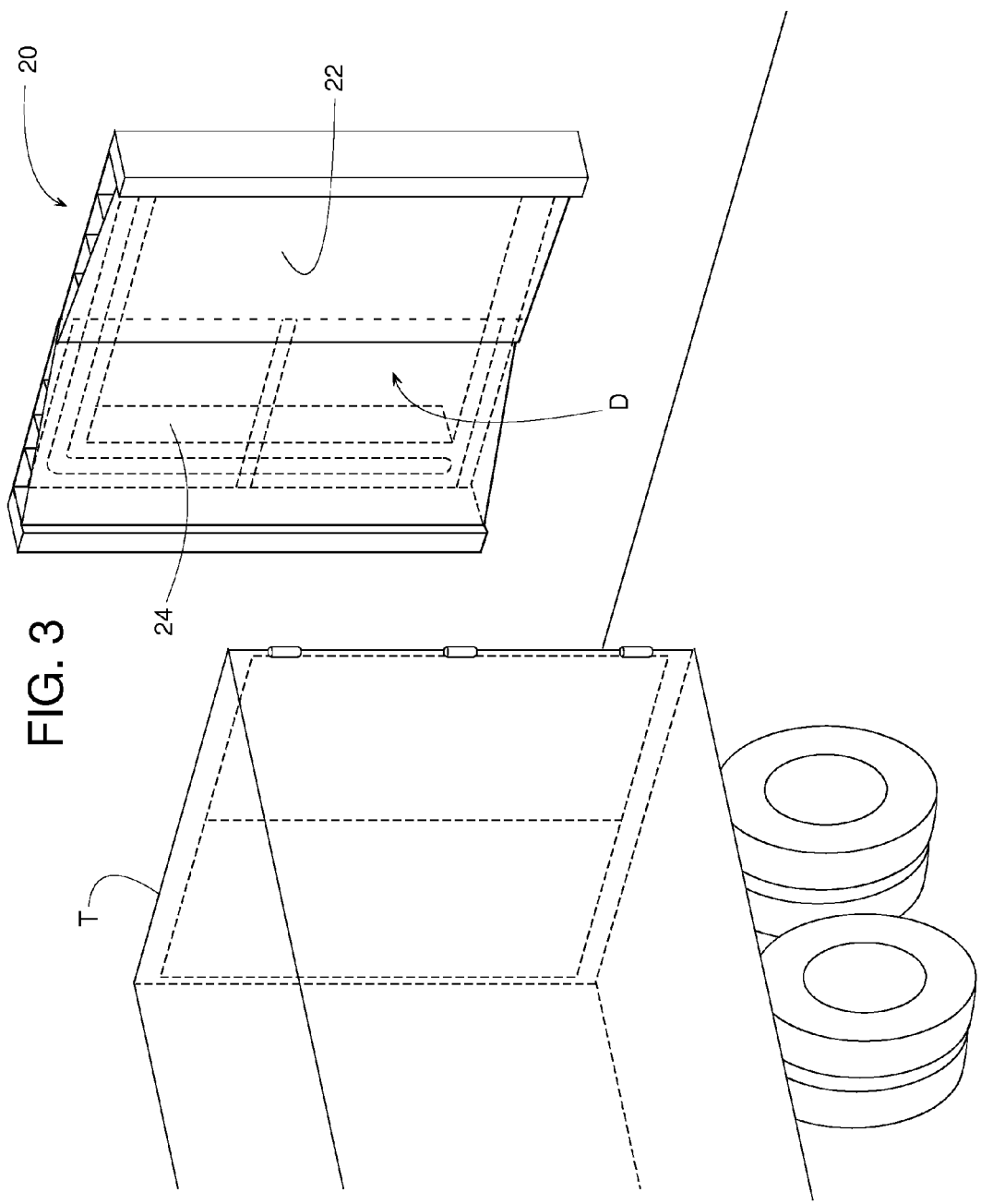
FIG. 3 is a perspective view of a loading dock position including an example door having an example deformable structure as described herein, showing the door in the closed position.
Figure 4:
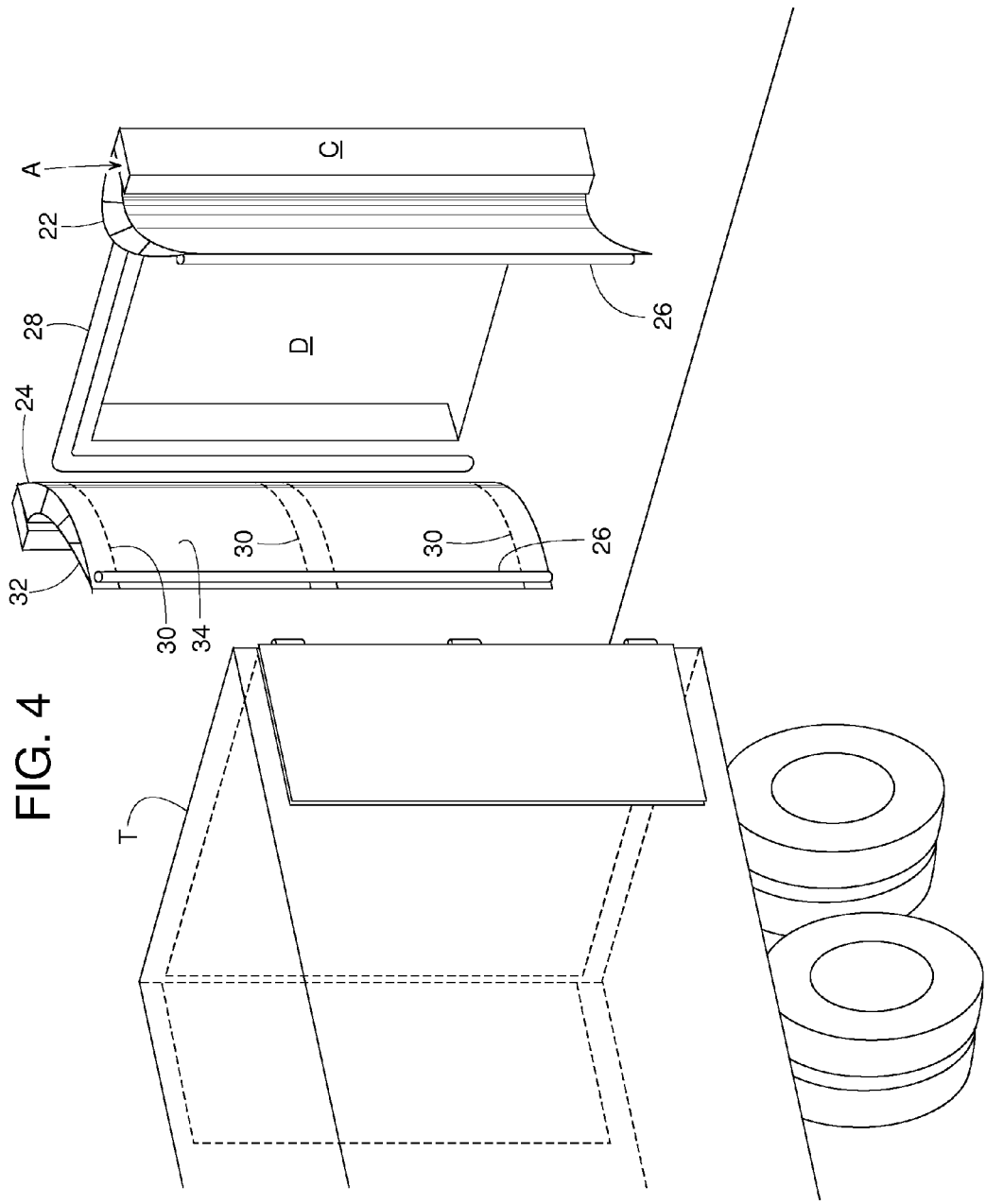
FIG. 4 is the door of FIG. 3 shown in the open position.

With this by way of operational background of FinRay structures, application of such structures is shown in FIGS. 3 and 4 in the context of a door 20 for a loading dock position. A loading dock is typically used for receiving a trailer T or lorry to be loaded or unloaded of goods through an opening in the rear of the trailer. For this purpose, a doorway D is provided at the exterior of the building to allow access to the trailer by personnel and/or equipment (forktrucks, pallet jacks, etc.) for the loading or unloading operation (referred to herein using the shorthand of "un/loading"). Usually, a loading bridge or dock leveler is provided to form a bridge from the floor of the building into the trailer—since the trailer is typically parked at a spaced distance from the building to prevent the trailer from contacting and damaging the building or itself. Other equipment may be present at a loading dock position to facilitate the un/loading process—such as a vehicle restraint or wheel restraint to help prevent movement of the trailer away from the dock as it is being un/loaded. A dock seal or shelter is also typically present, to provide environmental separation between the outside of the trailer and the interior of the building while the trailer is in its un/loading position. Such environmental separation may include keeping cold or warm air, rain or snow, dust, etc. from entering the building from the gap between the parked trailer and the loading dock doorway. As will be discussed below, the door 20 incorporating FinRay structures may also be configured to serve not only as a door for the loading dock doorway D, but also as a seal to provide such environmental separation.

When a trailer is not present at the loading dock opening, it may be desirable to close the loading dock opening with a door. The loading dock door 20 is shown performing this function in FIG. 3, and being actuated into an open position relative to the doorway D in FIG. 4. In this example, the door 20 is illustratively formed by a right-hand member 22 and a left-hand member 24, each including FinRay structures (e.g., the structure 10') as described above. In the closed position, the members 22, 24 extend across the doorway D so as to block the doorway D, and the members 22, 24 engage each other to close the opening. To help provide a good seal at the joint where the two members 22, 24 meet, each member 22, 24 may include a seal adjacent its distal end, illustratively in the form of a compressible element (e.g. foam wrapped in a fabric). Since the members 22, 24 are shown in the closed position in FIG. 3, the compressible elements are not shown. They can be seen in FIG. 4, however, bearing reference numeral 26. There, they are shown disposed on the inner face (the face directed toward the building when the members are in the closed position) of the members 22, 24. To create a seal in the closed position, the right-hand member 22 may overlap the left-hand member 24 so that the compressible element 26 on the member 22 compresses and seals against the outward face of element 24. It will be appreciated that a variety of compressible or other sealing structures could be used to achieve a similar result.

Sealing of the closed door 20 around the perimeter of the doorway D may be enhanced by a perimeter seal 28 in one or several pieces. Such a seal 28 can be seen in the view of FIG. 4 with the dock door 20 shown in the open position. The seal 28 is preferably some form of compressive member, such as fabric-encased foam, or alternatively an inflated fabric seal. An inflated seal may be preferable, as it tends to be more forgiving to surface inconsistencies in a member being compressed against it. Regardless of the structural details of such a perimeter seal 28, the door members 22 and/or 24 compress against the seal 28 when they are in the closed position. It will be appreciated that other configurations and placements of such seals could achieve the same or similar effects.

Actuation of the members 22 and 24 to move them between the closed position (FIG. 3) and open position (FIG. 4) can be achieved by including FinRay structures in their construction. As will be detailed below, such construction may take the form of one or more spaced (e.g., vertically spaced) FinRay structures being disposed in a generally horizontal orientation inside an outer skin formed of a sheet or sheets of textile or other flexible material. Such a construction can be seen in the left-hand element 24 in FIG. 4 with, illustratively, three FinRay structures 30 inside a skin formed of a first, outer sheet 32 and a second, inner sheet 34 connected to each other at the leading edge of the left-hand door member 24. The first and second sheets 32, 34 could also form a unitary sheet. The sheets 32, 34 are coupled to the structures 30 for movement therewith by any suitable connection method such as, for example, gluing, taping, bonding, heat-sealing, riveting, etc. In the alternative, a door element could be formed as a "monolithic" FinRay structure as will be detailed further below, and as depicted in the right-hand door member 22 in FIG. 4. Here, rather than the door member 22 including discrete FinRay structures inside a skin (as in door element 24), the skin itself may form the side elements of FinRay structures spanning the height (e.g., the vertical height) of the door member 22. While connecting ribs of such FinRay structures could also span the vertical height of the door member 22 as depicted in FIG. 4, similar functionality with reduced materials can also be achieved with the connecting ribs being of shorter height and spaced (e.g., vertically) through the height of the door member 22.

Whether constructions like the left-hand door member 24 or right-hand door member 22 of FIG. 4 are used (or other constructions incorporating FinRay structures), appropriate longitudinal actuation forces are be applied to move the door 20 between the closed and open positions. While more detailed disclosure of such actuation systems will be provided below, for the purpose of FIGS. 3-6, such actuators are depicted in FIG. 4 as idealized functional blocks A (for actuator or actuators) disposed inside casings C fixed, illustratively to the exterior building wall beyond the width of the loading dock doorway D. Actuators A are coupled to the respective FinRay structures that are inside of, or which form the door elements 22, 24 to provide the necessary pulling and/or pushing forces to the side elements (e.g., the side elements 14' and 14" of FIG. 2) of such structures to move the door elements 22, 24 according to the FinRay effect. The actuators A may be directly coupled to the respective FinRay structures for this purpose. Alternatively, the actuators A could be indirectly coupled to the FinRay structures. For example, for a door member like the left-hand member 24 of FIG. 4, the actuators A could be coupled indirectly to the FinRay structures 30 by being coupled to the skin (e.g., the sheets 32 and 34), which are in turn coupled to the FinRay structures 30. If this were the case, the material forming the skin would need to be selected to have adequate tensile and compression properties to properly transfer such forces to the FinRay structures 30. For actuation of a door member like the right-hand member 22 of FIG. 4, actuators A would act directly on the skin, since it is not only the outer surface of the member 22, but an active side member in FinRay structures. In this context, it should be noted that the term "longitudinal" pulling or pushing force should be understood in the context of pulling or pushing a sheet-like member (as opposed to a discrete FinRay element like 30 in FIG. 4) to be a force applied in the plane of the sheet-like member, generally perpendicular to a free edge thereof.

Figure 5:
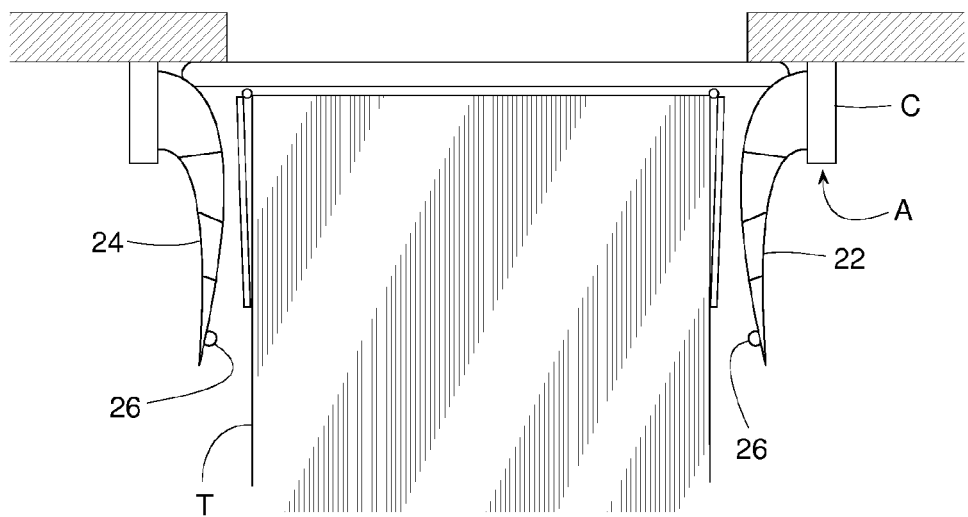
FIG. 5 is a plan view of the loading dock position of FIGS. 3 and 4, showing the door in a fully open position, and a trailer parked at the loading dock.

Use of structures incorporating the FinRay effect in the application of loading dock doors also allows such structures to provide additional functionality by creating a seal against the parked trailer T when it is in the un/loading position. In FIG. 5, the door 20 is shown in the open position, with the trailer T now moved to its un/loading position adjacent the doorway D. To allow a seal to be provided against at least the side surfaces of the trailer T, the actuators A begin to move the door elements 22, 24 toward the closed position. Since the trailer T is impeding that movement, the door elements 22, 24 instead move to the illustrative position of FIG. 6, in which the door elements 22, 24 engage and seal against the trailer T. To facilitate such sealing, the compressive members 26 on the door elements 22, 24 may be positioned so that they can be compressed against the trailer T when the door elements 22, 24 are in this position. Alternatively, the outer skins of the door elements 22, 24 themselves could seal directly to the trailer T. In either event, the sealing force may be enhanced by the FinRay effect. The FinRay effect is not limited to application of "longitudinal" pushing and pulling forces to free ends of FinRay structures. The FinRay effect also applies to external forces being applied to the side members of FinRay structures. Indeed, a unique property of FinRay structures is the ability to react to such an applied force to one of the side members by distributing that applied force, and providing a reactive displacement elsewhere on the element in a direction opposite to that of the applied force. This effect is seen in FIG. 6 with the tips of the door elements 22, 24 "wrapping around" the compressive member 26 so that the connection point at the tip of each element 22, 24 is also engaging the trailer T to enhance the seal by providing a second sealing surface in addition to that of the compressive member 26.

The presence of the door elements 22, 24 engaging the sides of the trailer T help provide environmental separation between the outside of the trailer T and the inside of the building via the passageway D. This is enhanced in the illustrative example shown in FIG. 6 in that the seal is formed adjacent (e.g., in front of) the trailer doors. This is advantageous in that it eliminates the need to seal a "hinge gap" H typically formed between the trailer doors and the sidewalls of the trailer T. If the seal provided by the door members 22, 24 was not adjacent (e.g., in front of) the doors of the trailer T, as shown, an air path would exist between the doors of the trailer T and the sides of the trailer T, and air could flow into or out of the building through the hinge gaps H. Loading dock seals or shelters often include a structure for engaging the hinge gap H to prevent such infiltration, but the ability of the door structure 20 to seal the hinge gap H (e.g., to seal out in front of the trailer doors) eliminates that need in this example. The door elements 22, 24 could also be sized so that they seal against the trailer T or trailer doors at a location closer to the rear of the trailer T, but this might necessitate other structure to seal the hinge gap H.

Figure 6:
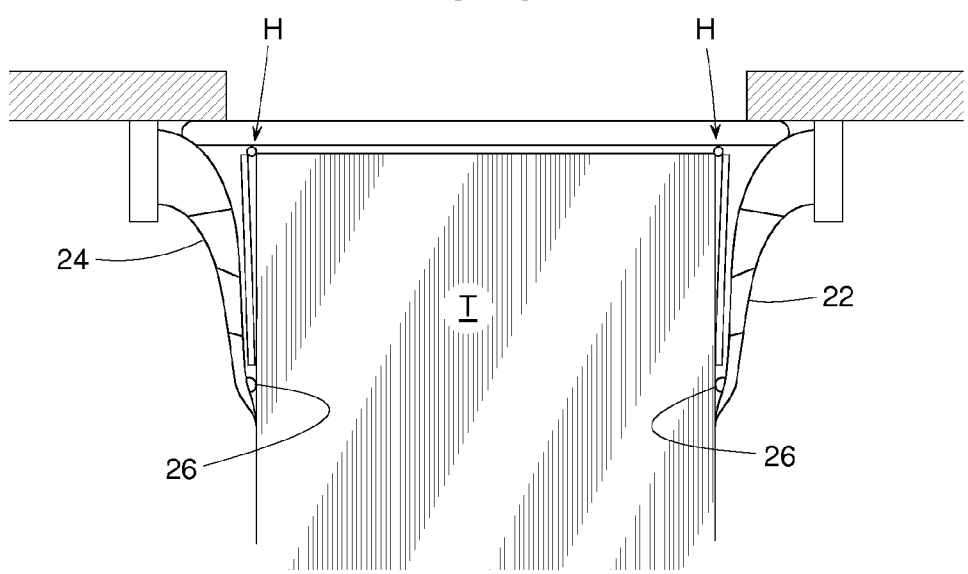
FIG. 6 is the door of FIG. 5, but moved to a position where the door is engaging the trailer.
Figure 7A:
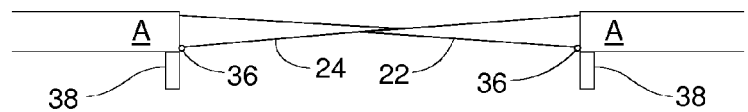
FIGS. 7a-e are plan views showing an example door's movement through an operational sequence.
Figure 7B:
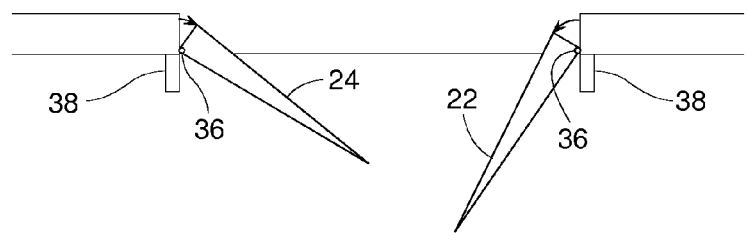
Figure 7C:
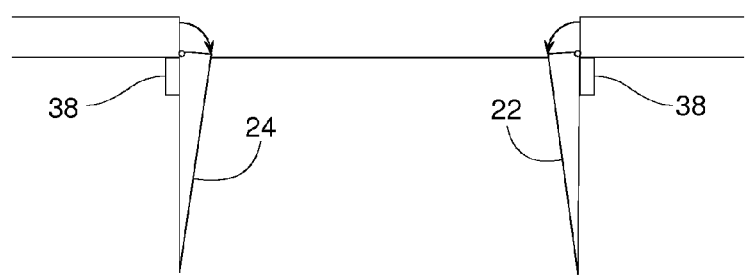
Figure 7D:
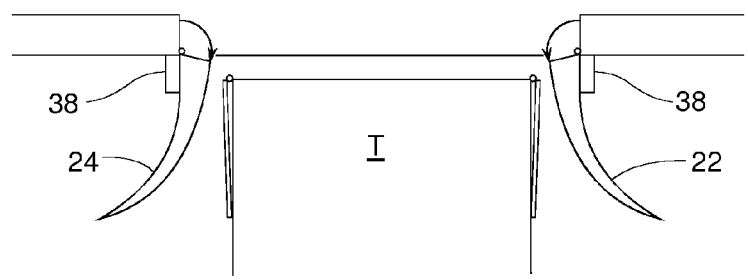
Figure 7E:
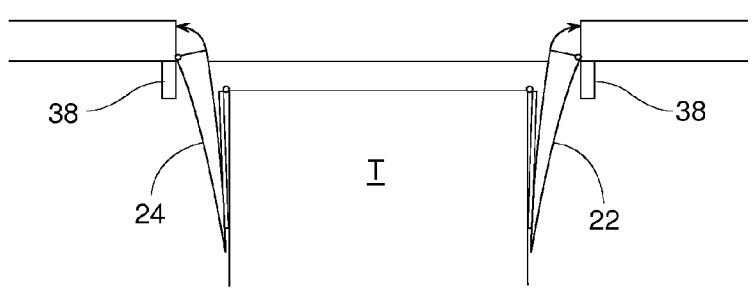

While door elements 22, 24 that include FinRay structures have been shown in FIG. 6 engaging the sides of the trailer T, a trailer top seal could also be provided using such structures. Such a top seal would illustratively be disposed above the doorway opening D and be maintained in a raised, retracted, position until the trailer T was in the un/loading position. It would then be actuated to allow a seal to move or seal against a top surface of the trailer T, preferably with such sealing being enhanced by the FinRay effect as in the case of the door elements 22, 24 providing a seal against the sides of the trailer T as described above. Alternatively, the top seal could also be a door element that would, for example, swing down from the top to overlap an upper portion of the side-acting door elements 22, 24 in the closed position. When the door is to be opened, the top member would preferably actuated first to move away from the travel path of the side door members 22, 24 as they open. Again, actuation of the top seal to engage and seal the trailer T would then be performed once it is in the un/loading position.

FIG. 7 shows an alternative actuation scheme for the door elements 22, 24 including FinRay structures, using only a single actuator A for each door element 22, 24. In this regard, an actuator A acts only on the "inner" side (i.e. the side of the door element facing toward the building in the closed position) of a door element. Rather than initially using the FinRay effect of the door elements 22, 24 to move the door from the closed to the open position, the door elements 22, 24 are pivotally mounted adjacent the doorway opening D so that the door elements 22, 24 can pivot outward due to forces applied by the actuator A. To achieve such operation in this example, the "outer" skin of the door elements 22, 24 is mounted to the building via a pivot 36, so that when the actuator A applies a pushing force to the inner skin, the door elements 22, 24 turn relative to pivot 36 without the door elements 22, 24 deforming. Thus, the door elements 22, 24 swing open in the manner of a conventional hinged door when pivoted about pivot 36. To allow the door elements 22, 24 to react according to the FinRay effect, a stop 38 is provided to check (e.g., stop) the rotation of the door elements 22, 24 about the pivot 36. Once the outer skin engages this stop 38 as shown in FIG. 7c, further application of a pushing force by the actuator A will cause deformation of the door elements 22, 24 according to the FinRay effect, as depicted in FIG. 7d. With the door elements 22, 24 now in the open position of FIG. 7d, the trailer T can be moved into the un/loading position. As before, movement of the door elements 22, 24 toward the closed position by the actuator A then allows the door elements 22, 24 to create a FinRay-enhanced seal against the sides of the trailer T as depicted in FIG. 7e.

Figure 8:
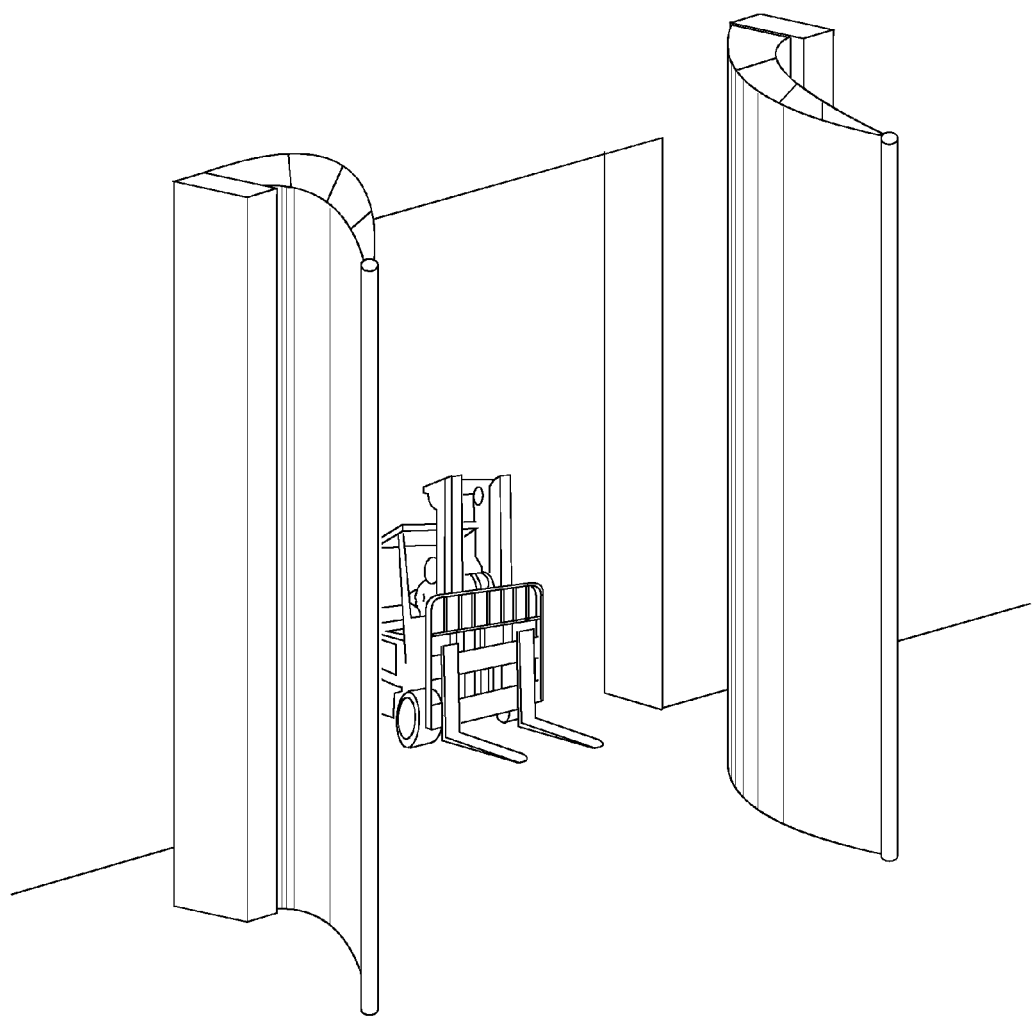
FIG. 8 is a perspective view of an example door including a deformable structure as described herein, shown in an open position adjacent an example opening in an industrial building.
Figure 9A:
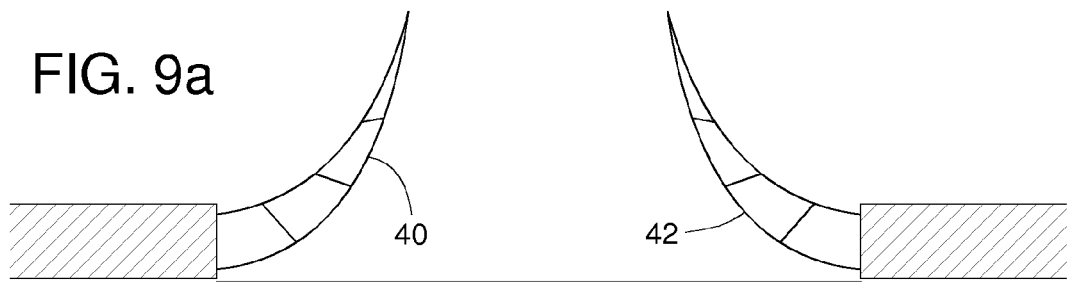
FIGS. 9a-c are plan views of different example doors elements or configurations, showing different application of the structures disclosed herein for covering and uncovering a door opening.
Figure 9B:
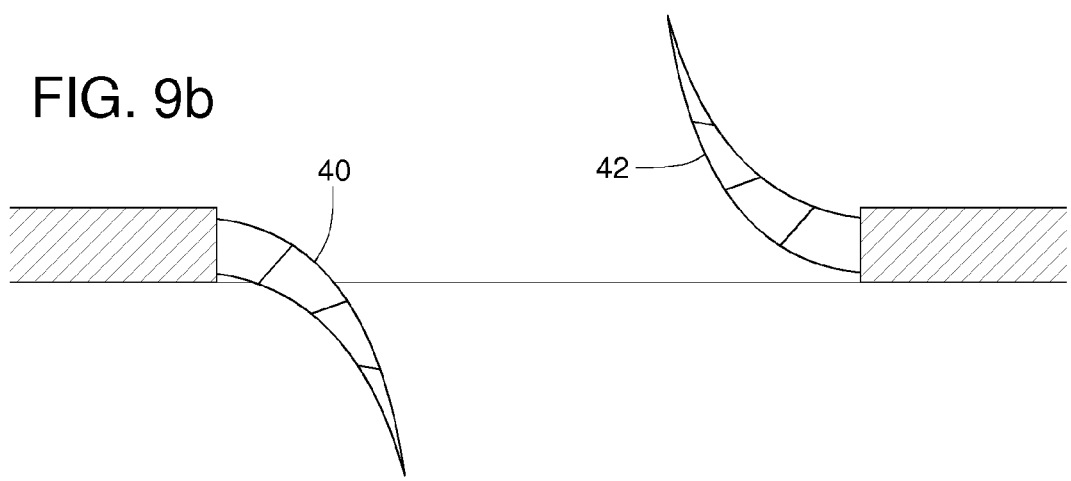
Figure 9C:
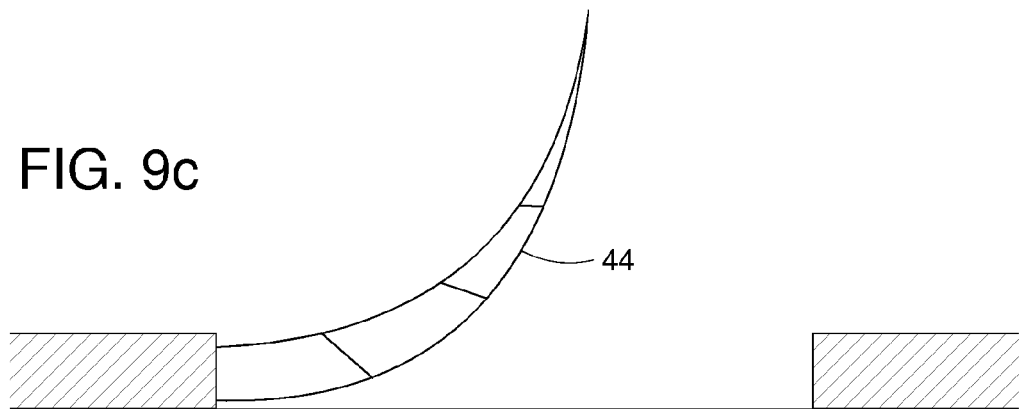

Application of FinRay structures to doors or other coverings for openings is not limited to loading dock doors, but rather could include the wide variety of applications referred to above. Use of such a structure for a generic interior opening in an industrial facility is shown in FIG. 8. Such an application may be advantageous given that impacts between forktrucks and doors can often cause significant damage to doors. The lightweight materials that can be used for a door including FinRay structures combined with the very high opening speed provided by the magnification of movement properties of such FinRay structures can minimize the effect or even the possibility of such impacts. Such doors, whether used in this application or others, can also have a small footprint for housings or other structures for the actuators, since only small actuation movement is required to actuate a door element between an open position and a closed position. Moreover, door or covering applications using FinRay structures have other flexibility in terms of how such structures might cover an opening. Three such examples of this are shown in FIGS. 9a, 9b, and 9c. In FIG. 9a, two door elements 40, 42 including FinRay structures are provided to cover a doorway, and are actuated to move between a closed position and an open position in the same direction relative to the doorway. While only shown swinging in an upward direction in the sense of the drawing, the elements 40, 42 could be actuated to swing in both directions (e.g., a downward direction). In distinction to the door of FIG. 9a, the door of FIG. 9b actuates the two elements 40, 42 in opposition directions relative to the doorway as they move between the closed and open positions. It is also possible to use a single door element 44 to cover an opening, as shown in FIG. 9c, including of course the possibility that such an element could be actuated in either or both directions between a closed position covering the opening, and an open position.

Given the speed with which door elements incorporating FinRay structures may be actuated, provision may need to be made in their construction to prevent unwanted effects. One such unwanted effect may be undue air disturbance adjacent the doorway—resulting from rapid movement of a sheet of fabric forming the outer skin of such an element. Such air disturbance could kick up dust or other airborne particulates, blow paper around, or even be strong enough to knock a person off-balance. To help avoid such problems, it may be desirable to provide a FinRay door element with structure to minimize the air disturbance that will be caused by the rapid movement of the element.

Figure 10:
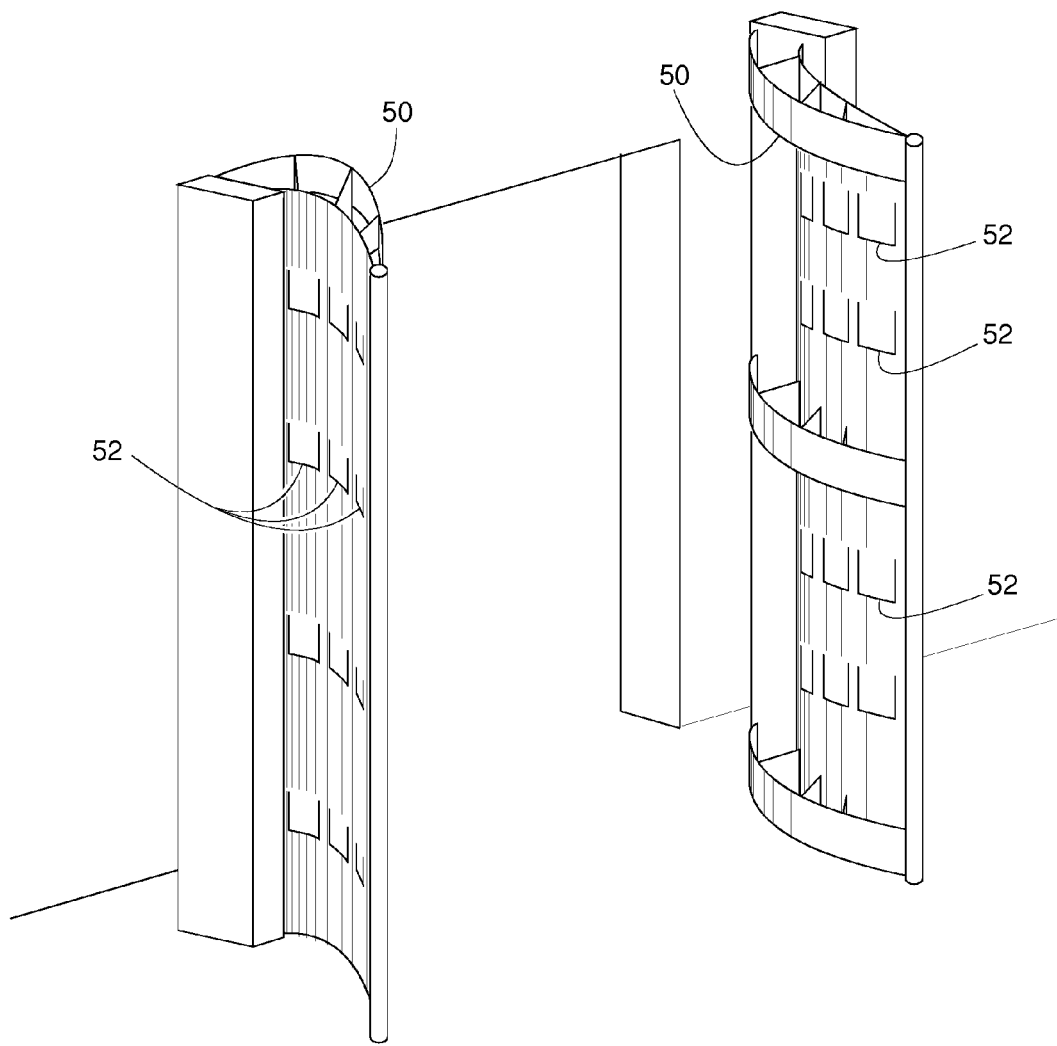
FIG. 10 is an example door similar to the example door of FIG. 8, but including air passage structures that allow air to pass through the door as it moves between an open position and a closed position.
Figure 11A:
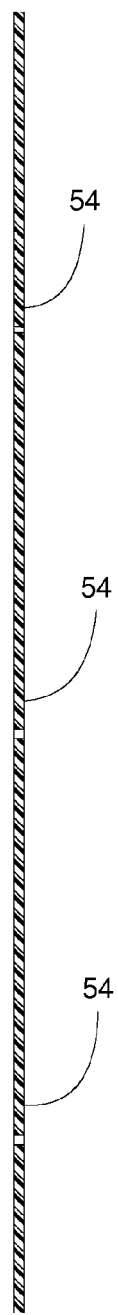
FIGS. 11a-c show details of the air passage structure of the example door of FIG. 10.
Figure 11B:
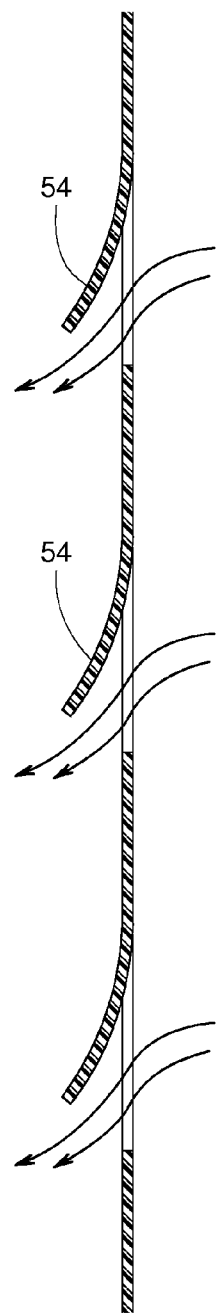
Figure 11C:
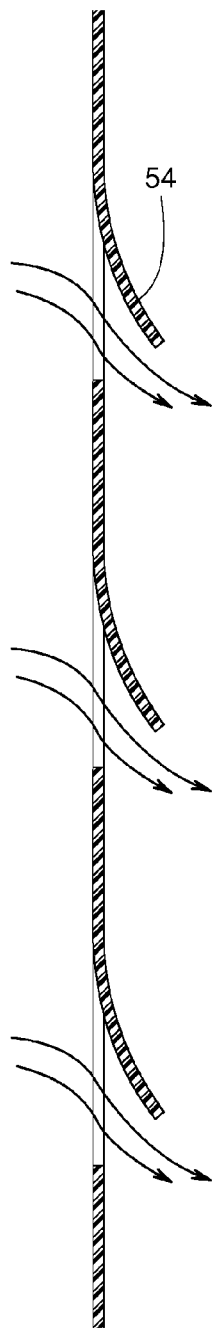

Toward that end, FIG. 10 shows a door having FinRay door elements 50 that illustratively include an array of openings 52 in the surfaces of the door elements 50. These openings 52 are intended to allow the passage of air therethrough as the door elements 50 are being actuated between closed and open positions. The presence of the openings, in effect, minimizes the surface area of the door that is pushing on the surrounding air as the door elements 50 move between open and closed positions. At the same time, having such openings 52 in the door may be undesirable when the door is in the closed position—particularly if the closed door is intended to provide environmental separation between the two sides of the doorway. To allow air passage during door movement, but to prevent air passage when the door is not moving the openings 52 in FIG. 10 (and as detailed in FIGS. 11a-11c) include a structure acting as a valve to the passage of air. The air valve structure is intended to be closed and prevent air passage when the door is not moving, but to be moved to an open position allowing air passage when the door is moving. In the illustrated example, the force for opening the valve is provided by the air pressure exerted on the door as a result of its movement between open and closed position. An exemplary illustration of such an air valve structure is shown in greater detail in FIGS. 11a-aac, with a valve 54 being formed as a flap in the exterior skin of a FinRay door element such as the door elements 50. In the illustrated example, the flap 54 is formed by making a cut of three sides of a rectangle (leaving, for example, the top side uncut) to form a flap. Alternatively, a flap of a different material than that forming the external skin may be placed over openings formed in that skin to provide the valve functionality. In either case, the flap 54 is intended to be biased to a position in which it prevents the passage of air as in FIG. 11a. In this example, the bias is provided by gravity. However, in other examples, the bias could also be enhanced by one or more other mechanisms—such as the resiliency of a fabric forming the flap, or an external biasing member such as a spring, a tensile member, etc. FIGS. 11b and 11c show the flap 54 being moved to an open position by the force of air pressure (depicted by arrows) applied to the flap 54 as a result of rapid door movement. As the door slow or stops, the applied pressure of the air becomes less and allows the flap 54 to move to the closed position to which it is biased. In this example, to maximize airflow through the door member as it moves between opened and closed positions, preferably both sides of the outer skin of the wedge-shaped door element would have such air valves (e.g., the flaps 54). This would allow air to pass through both surfaces of the door as it moves. Alternatively, as shown in FIG. 10, a door element may be formed with one skin having the valves, but entirely open on the other side (i.e. with no skin).

Figure 12:
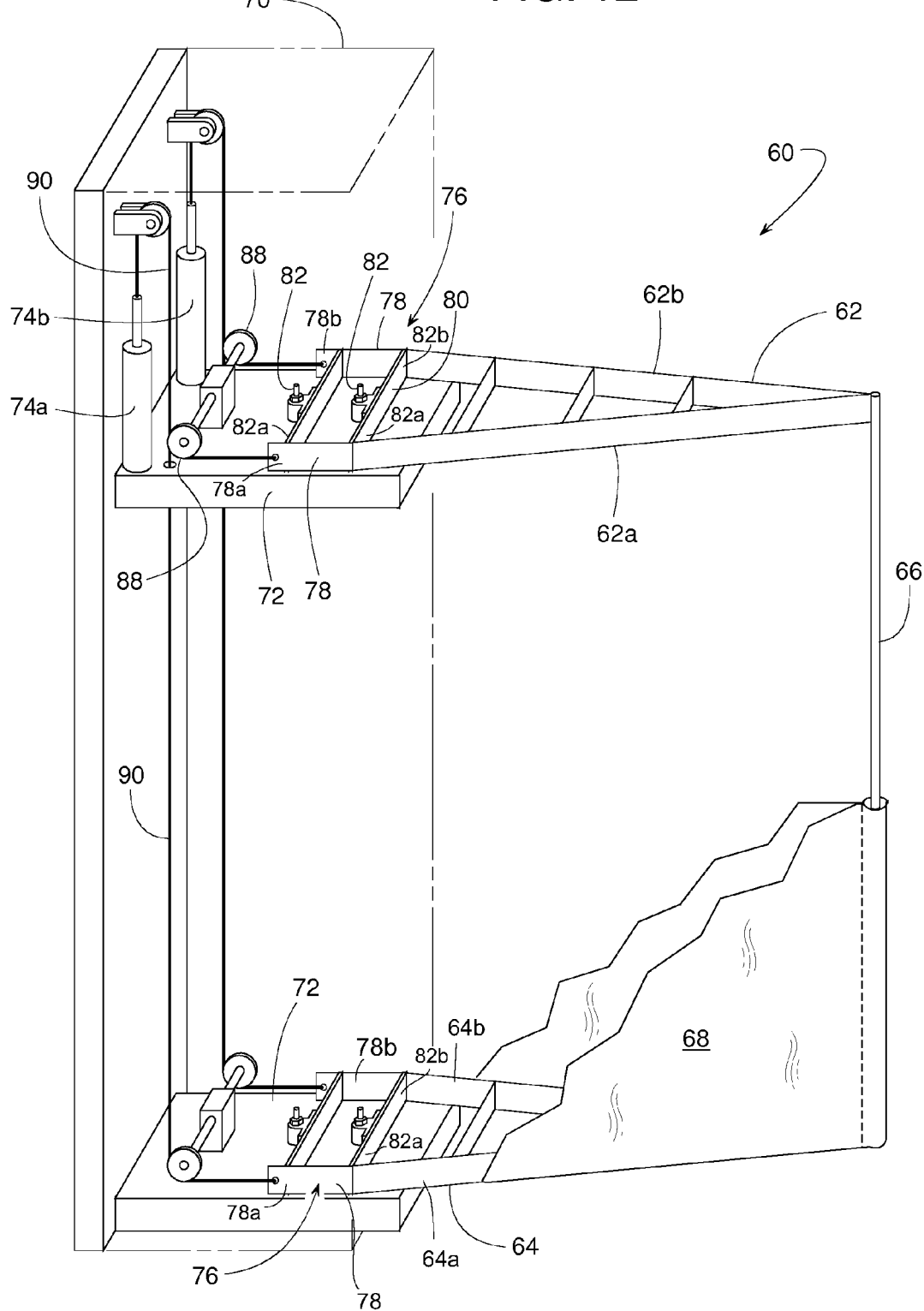
FIG. 12 is a partial cutaway detail of the assembly of an example door element including a deformable structure as disclosed herein.

FIG. 12 shows an example of the construction of a door element 60 incorporating FinRay structures. Reference can be made to FIG. 4, in which the left hand element 24 of the dock door was made up of discrete FinRay structures 30 disposed in a generally horizontal orientation inside of the skin made of one or more sheets of fabric 32, 34 (or other textile material). The details of such an assembly are shown in FIG. 12, including an upper FinRay structure 62, a lower FinRay structure 64 (only two are shown, but more could be included) connected to each other between their distal connection points by a structural member, illustratively in the form of a rod 66, to facilitate coordinated motion of the structures 62, 64. In other examples, the door element 60 includes a plurality of FinRay structures. A fabric skin 68 for the door element 60 is also shown—in this case as a single v-shaped piece of fabric complementary to the wedge shape of the FinRay structures 62, 64. In other examples, the skin 68 is made of multiple pieces of fabric. To receive the rod 66 connecting the FinRay structures 62, 64, a pocket is formed in the skin 68, for example by sewing. To allow the skin 68 to follow the movement of the internal FinRay structures 62, 64, the skin 68 is attached to the side elements of the structures 62, 64 by any attachment method(s) including, by way of example and not limitation, gluing, taping, bonding, heat-sealing, RF welding, riveting, etc.

To provide a structure for mounting and actuating the door element 60, this illustrative example shows a mounting in the form of a housing 70 and two mounting plates 72. Here, the housing 70 is a box structure that can be attached to a wall adjacent a doorway covered by the door element 60. The housing 70 houses a pair of actuators, illustratively in the form of linear actuators such as hydraulic cylinders 74a and 74b—although other forms of linear actuators could be used in this example. The cylinders 74a and 74b are fixed to support members attached to the back wall of the housing 70. It will be noted that the cylinders 74a and/or 74b are rather short. This is owing to the movement magnification properties of the FinRay structures 62, 64, thus allowing small actuators for a large range of movement. Also mounted to the back wall of the housing 70 are the mounting plates 72 for receiving and supporting the FinRay structures 62, 64. Each mounting plate 72—fixed to the wall of the housing 70 using a conventional fastener or permanent fastening technique such as welding—extends far enough away from the wall of the housing 70 to provide a supporting surface to help support and offset the weight of the associated FinRay structures 62, 64 and attached skin 68. Toward that end, the inner ends of the side elements of each of the FinRay structures 62, 64 rest on the mounting plate 72.

Given that the inner ends of the FinRay structures 62, 64 will be subject to longitudinal pulling and pushing forces by the actuation mechanism employed, the mounting includes structure for constraining movement of the FinRay structures 62, 64 toward and away from the front wall of the housing 70 in a generally horizontal plane. At the same time, it is desirable for the pulling and pushing forces to be applied as efficiently as possible. In this example, a single structure or linkage 76 constrains the FinRay elements' 62, 64 unwanted horizontal movement, as well as efficiently applying pulling and pushing forces thereto. The linkage 76 is illustratively in the form of a 4-bar linkage with a pair of side members 78 pivotally connected to a pair of cross-struts 80 to form the linkage 76 (e.g., a box structure). The side members 78 and cross-struts 80 are preferably rigid, and connected to each other by a connection (such as a hinge) that allows them to freely rotate relative to the members to which they are coupled. The linkage 76 is mounted to the mounting plate 72 by virtue of the cross-struts 80 including tabs with openings for receiving axles 82 extending upward from the mounting plate 72. The openings in the tabs on the cross-struts 80 may include bearings to facilitate rotation of the openings about the axles 82 for applied forces, as disclosed below. The mounting of the cross-struts 80 to the axles 82 in this way also constrains the linkage 76 (and the FinRay structure 62, 64 to which it is attached) from being able to translate in a direction away from the rear wall of the housing 70. The axles 82 may be threaded to allow a locknut or other fastener to be placed above the tab on the cross-strut 80 to prevent the weight of the respective attached FinRay structures 62, 64 from lifting the linkage 76 off of the mounting plate 72.

In terms of the fabrication of the FinRay structures 62, 64 themselves, this example envisions structures that could be formed in a single operation—such as by extrusion or molding of the structures, or formation of the structures by stamping or cutting them from a sheet of material (e.g., a strip material). The material would be chosen in order that it could be fabricated by such a method, while still having the necessary properties to make it viable as a FinRay element in such an application. In addition to being able to transmit the required compressive and tensile forces, the FinRay structures 62, 64 would also need to have adequate structural integrity to be able to form the inner structure of a door element without sagging due to the weight of the element. For outdoor applications, the material would also need adequate thermal stability properties for variations in temperature as well as resistance to UV.

To allow the FinRay structures 62, 64 to be acted on by the actuation mechanism including the actuators 74a and 74b and the linkages 76, the inner ends of the side members of the structures 62, 64 are coupled to the distal ends of the side members 78 of the linkages 76. While the respective side members could be fastened together (such as by gluing, bonding, riveting, etc.), in the illustrated example, a hinge structure is provided between the side members 78 of the linkage 76 and the side members of the FinRay structures 62, 64.

The linkage 76 serves to efficiently transmit displacement and force from the actuator/cylinders 74 to the FinRay structures 62, 64. For example, for a pulling force exerted on a side member 78a (e.g., toward the back wall of the housing 70 in the sense of the drawing), the ends 80a of the cross-struts 80 attached to side member 78a will move to the left in the orientation of the FIG. 12 (i.e., toward the back wall of housing 70), thus exerting a pulling force on a side member 62a of the FinRay structure 62. At the same time, by virtue of the operation of the linkage 76, a side member 78b of the linkage (the one opposite 78a) will move to the right in the orientation of FIG. 12 (e.g., will move away from the back wall of the housing 70), to thus exert a pushing force on another side member 62b of the FinRay structure 62. As mentioned above, the deflection of the FinRay structure 62 is most pronounced when a pulling force is exerted on one side member (e.g., side member 78a) and a pushing force is exerted on the other side member (e.g., side member 78b), so this linkage 76 provides such beneficial deflection to the FinRay structures 62, 64 for all applied forces.

To transmit the necessary forces from the cylinders 74a and 74b to the linkages 76, so that they can in turn actuate the FinRay structures 62, 64, this example shows a system using cables. Each mounting plate 72 includes a pair of vertically-disposed rollers or cable sheaves 88, in this case mounted on the same axle fixed to the mounting plate 72. The rollers 88 are received within conventional bearings to allow them to rotate with a minimum amount of frictional resistance. A single cable 90 is then run from the inner end of one side member 78a and/or 78b of the linkage 76, under and around the roller 88 disposed behind that side member 78a and/or 78b of the linkage 76. The cable 90 is then passed over another vertical roller or cable sheave disposed on the housing 70 above its respective linear actuator or cylinder 74a or 74b and is then subsequently fixed to the end of one of the cylinders 74a and/or 74b. Preferably, the cables 90 for the bottom FinRay structure 64 and that for the top FinRay structure 62 are coupled together to coordinate movement of the two FinRay structures 62, 64 shown. Moreover, the cables 90 may be pre-stressed to minimize slack.

To actuate the door element 60 shown in FIG. 12 to deflect out of the page in the sense of the drawing, the actuator 74a (e.g., toward the front in the sense of the drawing) would be retracted. This would cause the front side members 78a of the linkages 76 to exert a pulling force on the respective side members 62a, 64a of the FinRay structures 62, 64 while causing the other side members 78b of the linkages 76 to exert a pushing force on the other side elements 62b, 64b of the FinRay structures 62, 64. The other actuator/cylinder 74b could either be extended simultaneously, or be unlocked so that movement of a piston of the cylinder 74b could be extended by externally applied forces. Either way, later retraction of the cylinder 74b would return the door element 60 to the "closed" position as shown in FIG. 12. The use of sensors, such as limit switches or linear transducers could be employed to set the position of the pistons of the actuator/cylinders 74a and/or 74b for the door in the rest position. Open commands from the control electronics for the door would then cause appropriate movement of the actuators in response to such a command.

It will be appreciated that the linkage 76 shown has the beneficial property of applying both pulling and pushing forces simultaneously to both side elements of a FinRay structure. This beneficial result is not limited to that structure, however, and other actuation mechanisms could provide similar function. Such simultaneous action is not required, however, of the actuators or actuation mechanisms for door elements disclosed herein, and independent actuation of the side elements of such FinRay structures is also possible and within the scope of this disclosure.

Figure 13:
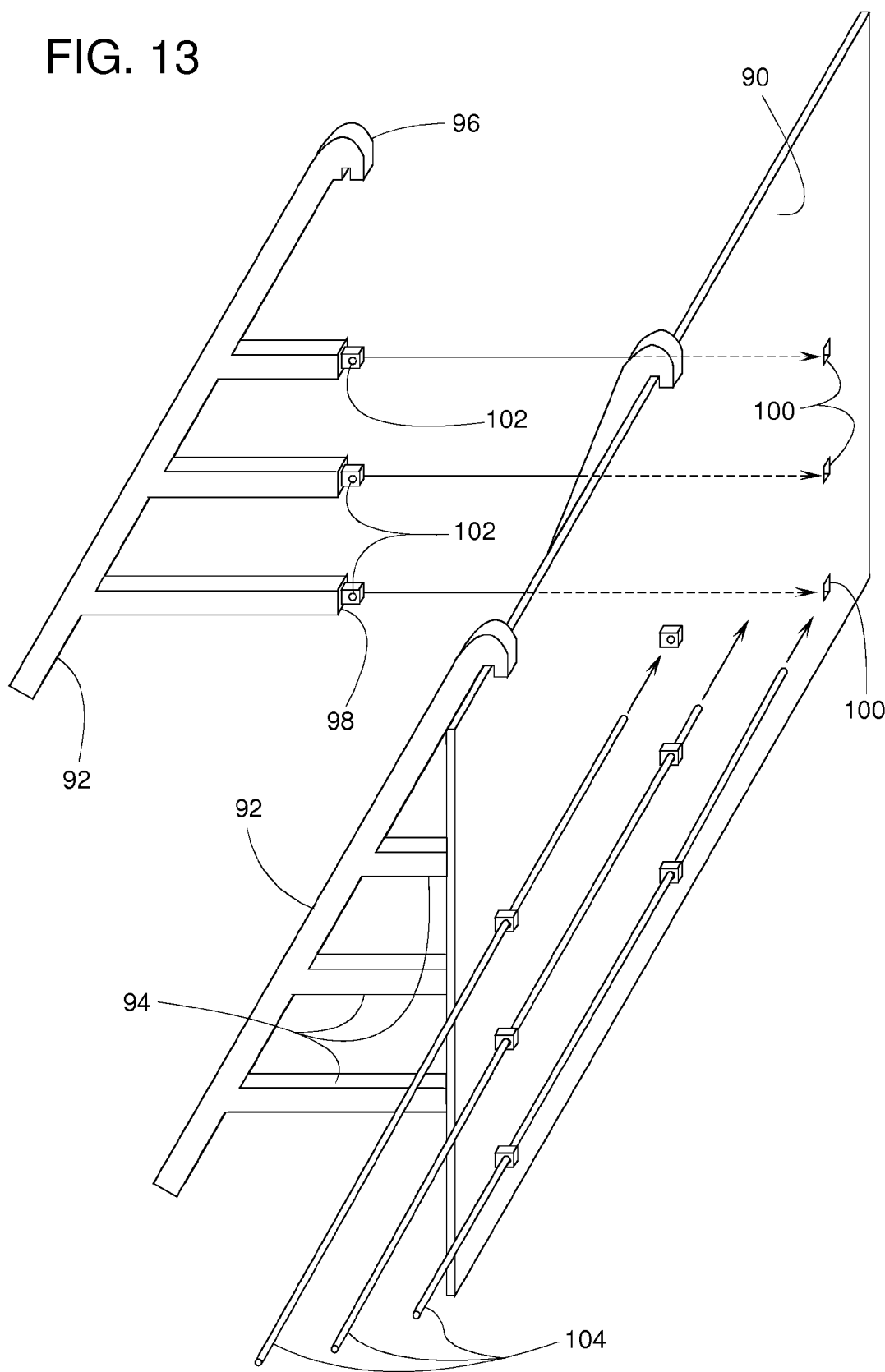
FIG. 13 is a detail of a partial assembly of another example door element including a deformable structure described herein.

While FIG. 12 shows a door element formed of discrete FinRay structures coupled to an external skin, FIG. 13 shows an example where the external skin can form a side element of a FinRay structure. In that example, a sheet 90 of appropriate material (e.g. capable of transmitting compressive forces, yet flexible enough to deflect in a curved shape) forms one side member of a FinRay structure. The other side member of the structure is in the form of a series of spaced straps 92. Extending from the straps 92 to the sheet 90 are a series of connecting ribs 94 to provide the FinRay effect. The distal ends of the straps 92 are preferably provided with a hook shaped structure 96 (perhaps including a groove) to engage a free end of the sheet. The ends of the connecting ribs 94 coupled to the sheet have a reduced or different cross-section compared to the rest of the rib 94, to create a shoulder 98 between the rib 94 and the connecting end thereof. The connecting ends extend through complementally-shaped openings 100 in the sheet. The connecting ends also include openings 102 for receiving a connecting rod 104, and the example illustrates using single connecting rods 104 to couple multiple ribs 94 to the sheet 90. Since such long connecting rods 104 may need to bend when the FinRay structure deflects, they can be made of spring steel or other flexible material. The assembled structure results in FinRay structures with the single sheet 90 on one side, a series of spaced straps 92 on the other, and connecting ribs 94 to transmit the deflection of one of the side elements to the other according to the FinRay effect. If desired, a sheet of fabric could be coupled to the spaced straps to provide the door element with a closed, finished appearance.

Figures 14, 14A:
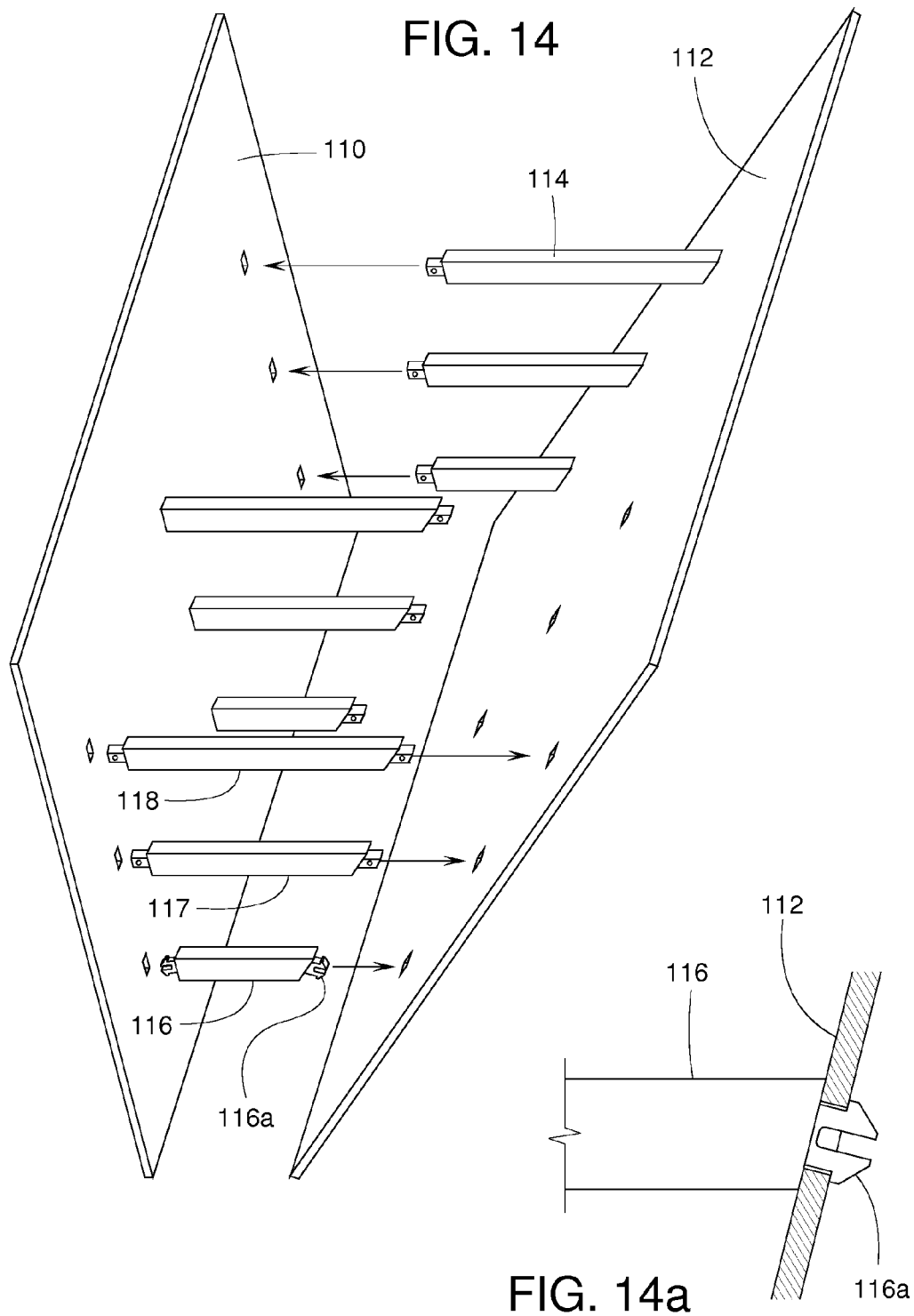
FIG. 14 is a detail another example door element including a deformable structure disclosed herein.
FIG. 14a is a detail of the connection between parts in the door element of FIG. 14.

FinRay structures in which both side elements of the structures are formed from sheet material is shown in FIG. 14. In this case, sheets 110, 112 form the side elements, and connecting ribs 114 extend between the two side elements. For this example, discrete ribs, as opposed to ribs themselves formed of sheet-like material are shown, but both are possible. For example, rather than ribs 116, 117, 118 being discrete ribs, a single sheet in the same plane as 116, 117, 118 could extend between the side element sheets 110, 112 as a single rib. In this example, the individual ribs 116, 117, 118 are coupled to the sheets 110, 112 in a similar manner to that shown in FIG. 13. One rib 116, however, is shown with a different connecting scheme, detailed in FIG. 14a. The connecting end of the rib 116 has an expanded, but compressible section 116a beyond the shoulder, but spaced from the shoulder. When expanded, this section has a larger cross-section than the opening in the sheet 112 in which it is received. To connect the rib 116 to the sheet 110 or 112, the expanded section is compressed, so that it can pass through the opening in the sheet 110 or 112. Removal of the compressive force then allows the section to expand, thus trapping the expanded section on the outer side of the sheet 110 or 112 and connecting the rib 116 to the sheet 110 and/or 112.

Figure 15:
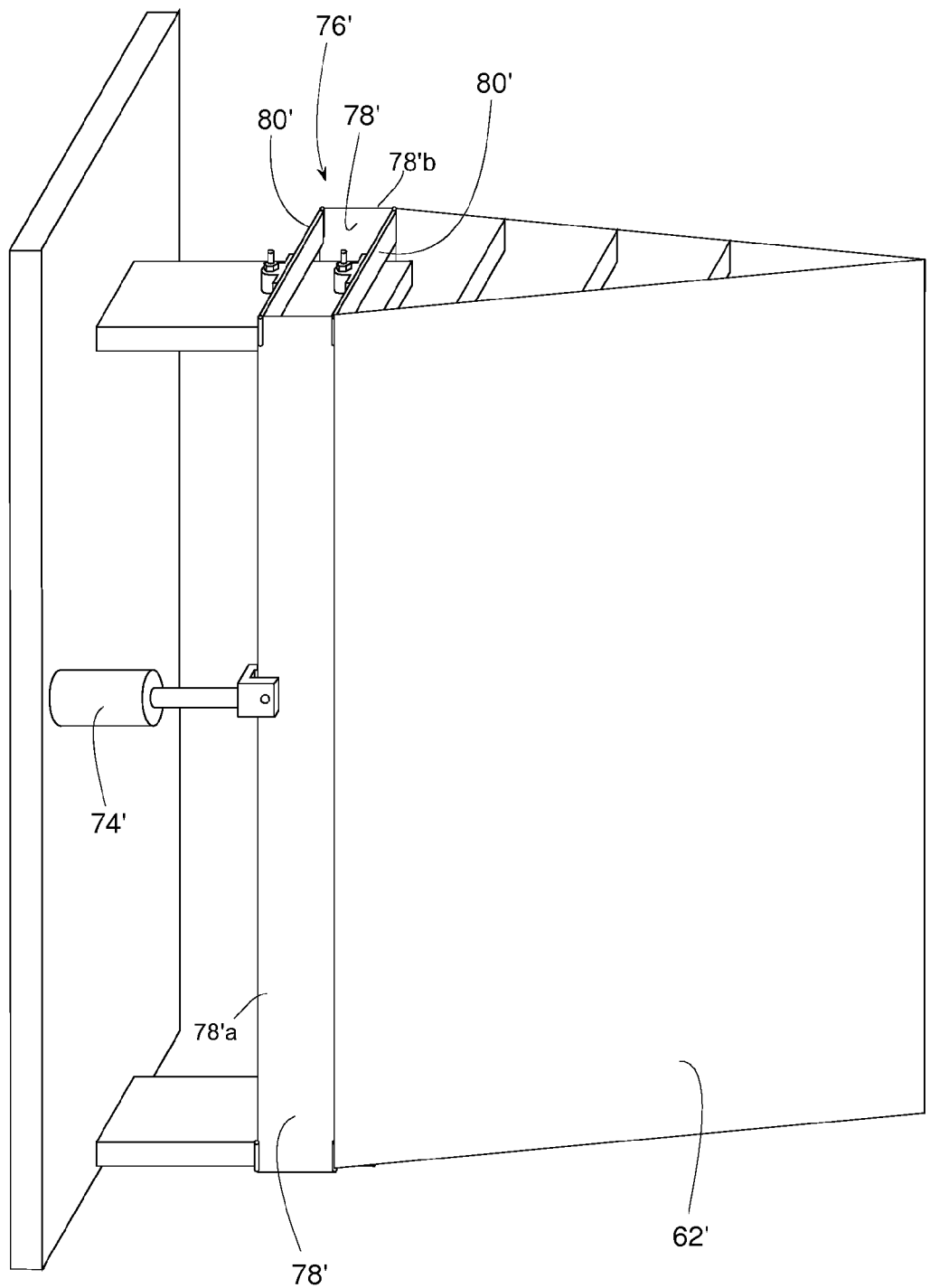
FIG. 15 is a perspective view of the assembly of another example door element including a deformable structure as disclosed herein.

FIG. 15 shows an example of a door element in the form of a monolithic FinRay structure, with detail of how such an assembly could be constructed. Similar to the construction of FIG. 12, the door element includes a 4-bar linkage 76' between an actuator 74' and, in this example, a unitary FinRay structure 62'. Here, the side members 78'a and 78'b of the linkage 76' extend the full height of the door element 62' so as to be coupled along the vertical length of the inner end of each of the sheets forming the side members of the FinRay structure 62'—for example with a hinge structure. A top and bottom set of cross-struts 80' (hinged to the side members) are provided in this example, although additional sets could be provided in between. The action of the linkage 76', and the presence of a full-height structural members 78'a and 78'b to transmit forces to a monolithic FinRay side element allows just a single actuator 74' to move the door element 62' through its entire range of movement (e.g., between a closed position and an open position). The actuator 74' is disposed to provide pushing and pulling forces to one of the side elements 78'a or 78'b of the linkage 76'. A pushing force applied to the side element 78'a results in that side element 78'a providing a pushing force on the adjacent side element 78'b of the FinRay structure 62' while the other side element 78'b pulls on its side of the FinRay structure 62', and vice versa. Thus, the need for an actuator acting on the opposite side (e.g., on the side element 78' b) is eliminated.

Figure 16:
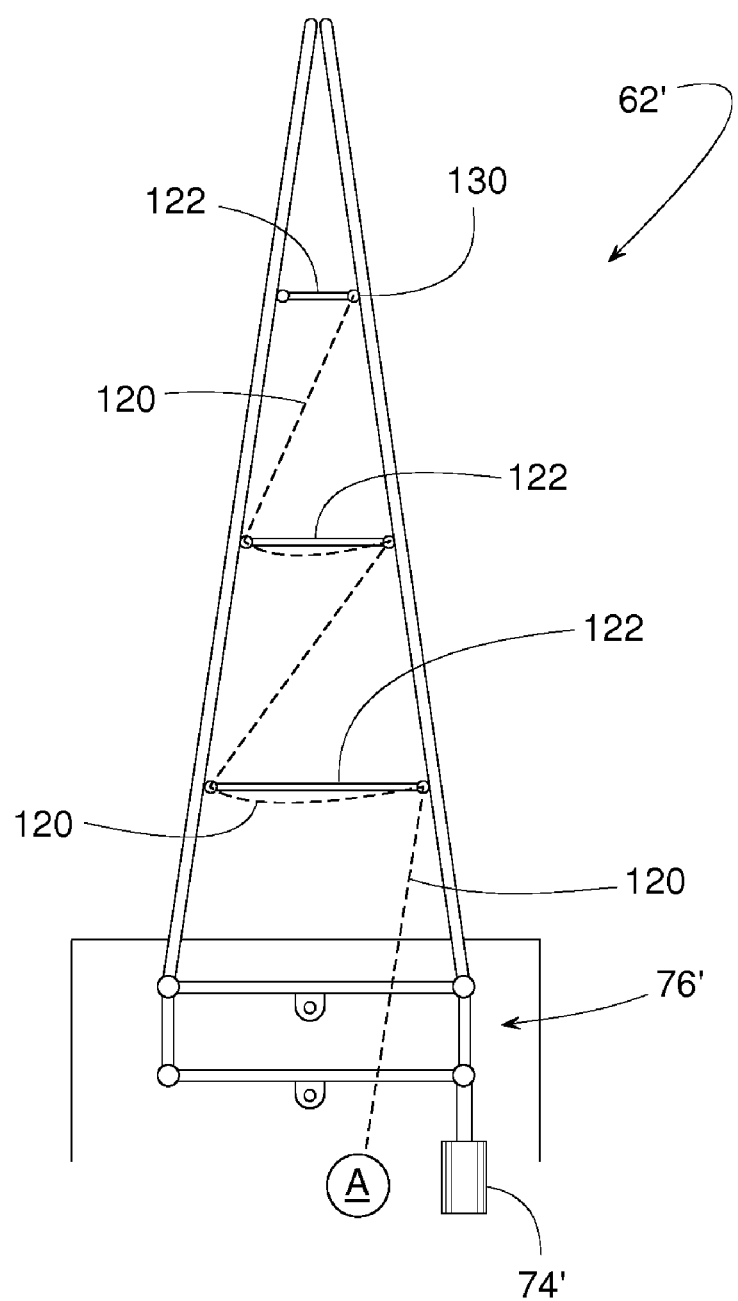
FIG. 16 is a plan view of another example door element including a deformable structure as disclosed herein.

FIG. 16 shows an additional actuation mechanism for a structure like that shown in FIG. 15. In addition to actuator 74' acting on the linkage 76', an idealized actuator A is employed. The actuator A is coupled to a tensile member 120. The tensile member is threaded through connecting ribs 122 at their connection points to the side members of the FinRay structure 62', so as to make a diagonal-shaped coupling between adjacent ribs 122. The distal end of the tensile member 120 is illustratively fixed to point 130 on the FinRay structure 62'. A pulling force on tensile member 120 by actuator A will tend to deflect the FinRay structure 62' clockwise in the sense of the drawing. Accordingly, actuator A could work in tandem with actuator 74' to bendably deform the FinRay structure 62'. Alternatively, all of the actuation required to deform FinRay structure 62' could be provided by the actuator A and tensile element 120, although that would only provide deformation in one direction (e.g., a clockwise direction). If element 120 were a pressure element (resistive of compressive forces) as well as a tensile element, actuator A could both push and pull element 120 to actuate the FinRay structure 62' in both directions (e.g., a clockwise and counter-clockwise direction). Moreover, multiple elements internal to a FinRay structure 62' (like tensile element 120) can be used to achieve desired operation. The unique properties of a structure like FinRay structure 62' allow a variety of actuation techniques to be employed to beneficial effect.

Although certain example methods, apparatus, and articles of manufacture have been described herein, the scope of the coverage of this patent is not limited thereto. On the contrary, this patent covers all methods, apparatus, and articles of manufacture fairly falling within the scope of the appended claims either literally or under the doctrine of equivalents.

The invention claimed is:

1. A door element movable between a closed position in which the element extends across a doorway to at least partially block the doorway, and an open position where at least a portion of the element moves to a non-blocking position relative to the doorway, the element comprising:
   a first flexible side element to transmit tensile forces and including a proximal end and a distal end;
   a second flexible side element to resist compressive forces and including a proximal end and a distal end, the first and second side elements being coupled to each other at their distal ends;
   a plurality of connecting ribs flexibly coupled to the first and second side elements to transmit tensile forces between the first and second side elements; and
   an actuator to apply a longitudinal tensile force to the proximal end of the first side element, wherein the resulting deformation of the second side element is transmitted to the first side element by the connecting ribs in movement of the door element to the open position.

2. A door element movable between a closed position in which the element extends across a doorway to at least partially block the doorway, and an open position where at least a portion of the element moves to a non-blocking position relative to the doorway, the element comprising:
   a first flexible side element to transmit tensile forces and including a proximal and a distal end;
   a second flexible side element to resist compressive forces and including a proximal and a distal end, the first and second side elements being coupled to each other at their distal ends;
   a plurality of connecting ribs flexibly coupled to the first and second side elements to transmit at least tensile forces between the first and second side elements; and
   an actuator to apply a longitudinal pressure force to the proximal end of the second side element, wherein the resulting deformation of the second side element is transmitted to the first side element by the connecting ribs in movement of the door element to the open position.

3. A door element movable between a closed position in which the element extends across a doorway to at least partially block the doorway, and an open position where at least a portion of the element moves to a non-blocking position relative to the doorway, the element comprising:
   a first flexible side element to transmit tensile forces and resist compressing forces and including a proximal and a distal end;
   a second flexible side element to transmit tensile forces and resist compressive forces and including a proximal and a distal end, the first and second side elements being coupled to each other at their distal ends;
   a plurality of connecting ribs flexibly coupled to the first and second side elements to transmit tensile forces between the first and second side elements; and
   an actuation mechanism to selectively apply longitudinal tensile and pressure forces to the proximal ends of the first and second side elements, wherein the resulting deformation of one of the first or second side elements is transmitted to the other of the first or second side elements by the connecting ribs in movement of the door element to the open position.

4. The door element of claim 3, wherein the first flexible side element, the second flexible side element and the plurality of connecting ribs form a deformable structure, and wherein the door element includes a spaced plurality of such deformable structures.

5. The door element of claim 4, and including an outer skin covering the deformable structures.

6. The door element of claim 4, wherein the outer skin is formed of a first outer sheet fixed to the first flexible side element and a second outer sheet fixed to the second flexible side element.

7. The door element of claim 3, wherein the first flexible side element is a flexible sheet.

8. The door element of claim 7, wherein the second flexible side element is a flexible sheet.

9. The door element of claim 3, wherein the element is disposed at a loading dock opening.

10. The door element of claim 9, wherein the element can be actuated to a position where it forms a seal with a vertical wall of a trailer parked adjacent the dock opening.

11. The door element of claim 10, wherein the element includes a compressible member disposed on a surface of the element that forms a seal with the vertical wall of the trailer, the compressible element being compressed between the door element and the vertical wall of the trailer to enhance the seal therebetween.

* * * * *